Aug. 19, 1969   R. E. SHEAHAN   3,461,480
CASTER BUMPER ASSEMBLY
Filed March 30, 1967

INVENTOR
ROBERT E. SHEAHAN

By Norton Lesser
Attorney

United States Patent Office 3,461,480
Patented Aug. 19, 1969

3,461,480
CASTER BUMPER ASSEMBLY
Robert E. Sheahan, Woodbridge, Conn., assignor to Stewart-Warner Corporation, Chicago, Ill., a corporation of Virginia
Filed Mar. 30, 1967, Ser. No. 627,098
Int. Cl. B60p 33/00
U.S. Cl. 16—18                                           4 Claims

ABSTRACT OF THE DISCLOSURE

A bumper assembly for a caster and having an annular resilient bumper member provided with a sealing portion.

---

One form of caster with which the present invention may be incorporated includes a horn with a crown, a caster wheel rotatably mounted at the lower end of the horn, a vertical attaching spindle, and bearing means mounting the horn crown to the lower end of the spindle for rotation about the axis thereof. The attaching spindle is adapted to be inserted into a socket provided in a truck, cart, or the like, to be supported by the caster. Frequently, while moving the truck or cart about, it is accidentally bumped into objects, such as furniture or walls, causing damage thereto. This of course is undesirable.

It is an object of the present invention to provide a caster with a revolvable resilient bumper member that is adapted to engage any object in the path of movement of the article supported by the caster whereby to cushion the shock of impact and prevent damage to either the object or the caster.

It is a further object of the present invention to provide a caster bumper member with a lower depending lip portion that has sealing engagement with the horn crown to prevent the passage of foreign material therebetween.

Now in order to acquaint those skilled in the art with the manner of constructing and using caster bumper assemblies in accordance with the principles of the present invention, there will be described in connection with the accompanying drawing a preferred embodiment of the invention.

Figures 1, 2, 3:
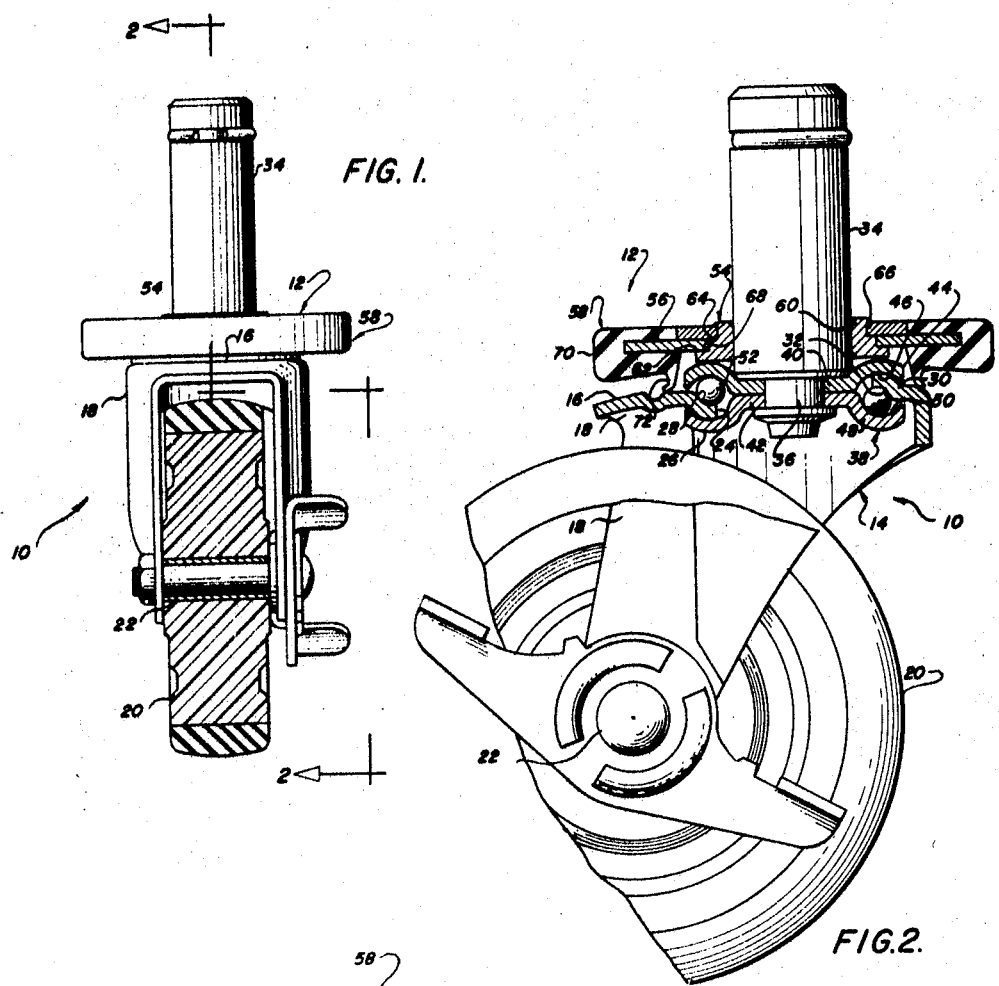
FIGURE 1 is an end elevational view of a caster incorporating the bumper assembly of the present invention.
FIGURE 2 is an enlarged vertical sectional view taken substantially along the line 2—2 in FIGURE 1, looking in the direction indicated by the arrows.
FIGURE 3 is a perspective view of the resilient bumper member of the bumper assembly of the present invention, with a portion thereof being broken away.

Referring now to FIGURES 1 and 2, there is shown one form of caster 10 with which the novel bumper assembly 12 of the present invention may be incorporated. The caster 10 includes a horn 14 comprised of a crown 16 and depending side leg portions 18. A caster wheel 20 is rotatably mounted on a horizontal axle 22 which is secured in the lower ends of the side leg portions 18, and which is offset laterally from the vertical axis of rotation of the horn 14. The crown 16 is formed with a central aperture 24 surrounded on one side, in the direction of the offset of the wheel axis, by a depressed semi-circular segmental flange 26 which defines a lower ball-race 28 at its upper side. The aperture 24 is surrounded on its other side by an upwardly offset semi-circular segmental flange 30 which defines an upper ball-race 32 at its underside.

Extending downwardly into the aperture 24 is an attaching member 34 in the form of a vertical spindle to which the horn 14 is mounted for rotation about a vertical axis by bearing means to be presently described. The spindle 34 has a lower reduced end portion 36 on which is staked or otherwise secured a bearing casing 38 comprised of upper and lower bearing plates 40 and 42. The upper plate 40 has an upwardly offset annular flange portion 44 which defines an upper bearing surface 46 at its underside, while the lower plate 42 has a downwardly offset annular flange portion 48 which defines a lower bearing surface 50 at its upper side. A row of balls 52 are arranged circumferentially within the bearing casing 38. On one side of the casing 38, the balls 52 are in engagement with the lower ball-race 28 and the upper bearing surface 46; on the other side of the casing 38, the balls 52 are in engagement with the upper ball-race 32 and the lower bearing surface 50. The segmental flanges 26 and 30, which are on two levels, are interconnected at their ends, in a conventional manner, by inclined ramps (not shown) which accommodate movement of the balls 52 from one level to the other as the caster swivels.

The spindle 34 is adapted to be inserted into a socket provided in the article to be supported by the caster. In response to the downward load imposed on the spindle 34, the offset of the horn 14 produces an upward thrust at the side at which the wheel axle 22 is disposed and a downward thrust at the opposite side. As a result, the flange 26 presses the adjacent balls 52 upwardly against the flange portion 44 of the upper bearing plate 40, and the flange 30 presses the adjacent balls 52 downwardly against the flange portion 48 of the lower bearing plate 42. In this manner, eccentric loading of the caster is accommodated. For additional details concerning the construction and operation of caster bearing means of the foregoing type, reference may be made to United States Patent No. 1,914,204, dated June 13, 1933.

The bumper assembly 12, as shown in FIGURES 2 and 3, is comprised of a collar unit 54, an annular disc 56 and an annular bumper member 58. The collar unit 54 includes a stepped collar member 60 formed with a lower annular shoulder 62 and an upper annular shoulder 64, and a washer 66 which is secured against the upper shoulder 64, for example, by flanging over the supper edge of the collar member 60. The lower shoulder 62 and the washer 66 together define an annular radially outwardly opening recess 68 in which the inner portion of the disc 56 is loosely received. The bumper member 58 has an annular body portion 70 molded with a vulcanized adhension about the outer portion of the disc 56 so that opposing surfaces of disc 56 are bonded to opposing surfaces defining an annular recess 71 formed between opposite ends of body 70. An integral lower depending lip portion 72 is formed at the lower end at the inner periphery of the body portion 70. The member 56, which has a uniform cross section, is preferably fabricated of soft non-marking rubber of 70–80 durometer A scale.

When the bumper assembly 12 is incorporated with the caster 10 (FIGURE 2), the collar unit 54 is engaged about the spindle 34 and bears against the flange portion 44 of the upper bearing plate 40. The lip portion 72 has sealing engagement or wiping contact with the horn crown 16 to prevent the passage of dirt and other foreign material therebetween. By molding the lip seal 72 integral with the resilient bumper 58, the expense of providing a separate sealing means for the bearing opening around the upper bearing plate 40 is avoided. In addition, the seal arrangement of the present invention complies with the requirements of the National Sanitary Foundation for sanitary casters. The disc 56 serves as means for revolvably mounting the bumper member 58 on the collar unit 54, and the bumper member 58 is thereby free to revolve around the axis of rotation of the horn as the caster swivels. The resilient bumper member 58 also extends radially beyond the perimeter of the horn crown 16 and the caster wheel 20 at the side of the swivel axis opposite the side at which the wheel axle 22 is disposed. The bumper member 58 is thus arranged to engage any object in the path of movement of the article supported by the caster whereby to cushion the shock of impact and prevent damage to either the object or the caster.

I claim:
1. A bumper assembly for use in a caster including a horn with a crown, an attaching member, and bearing means mounting the horn to the attaching member for rotation about a vertical axis, the improvement comprising a collar unit engaged on said attaching member and having an annular radially outwardly opening recess, an annular disc with the inner portion thereof being loosely received in said recess of said collar unit for rotation around the axis of rotation of the horn, and a bumper member having an annular resilient body portion with an annular recess in the inner surface thereof located between opposite ends of said body member and having opposite surfaces in bonded engagement with opposite surfaces of said annular disc about the outer portion of said annular disc.

2. A bumper assembly for use in a caster including a horn with a crown, an attaching member, and bearing means mounting the horn to the attaching member for rotation about a vertical axis, the improvement comprising a collar unit engaged with said attaching member and having an annular outwardly opening recess, an annular resilient bumper member, an annular disc having an outer body portion engaged in said annular recess and an inner portion loosely received in said collar unit recess for mouning said bumper member on said collar unit for rotation around said vertical axis of said horn, and a lower depending lip portion on said bumper member having sealing engagement with the horn crown.

3. A bumper assembly comprising a collar unit having an annular radially outwardly opening recess, an annular disc with the inner portion thereof being loosely received in said recess of said collar unit, an annular resilient bumper member, a body portion integrally formed on said bumper member engaged about the outer portion of said annular disc, and a lower depending lip portion at the inner periphery of said body portion.

4. In a caster including a horn with a crown, an attaching member, and bearing means mounting the horn to the attaching member for rotation about a vertical axis, the improvement comprising a bumper assembly mounted on the attaching member and including an annular resilient bumper member with a lower depending lip portion having wiping contact with the horn crown to seal the bearing means.

References Cited
UNITED STATES PATENTS

| | | | |
|---|---|---|---|
| 1,914,204 | 6/1933 | Herold et al. | 16—21 X |
| 2,290,001 | 7/1942 | Sherman | 248—345.1 |
| 2,787,804 | 4/1957 | Noelting et al. | 16—21 |
| 2,885,821 | 5/1959 | Frick. | |
| 3,399,421 | 9/1968 | Crawford | 16—26 |

DONALD A. GRIFFIN, Primary Examiner

U.S. Cl. X.R.

16—21